(12) United States Patent
Trustee

(10) Patent No.: US 6,230,852 B1
(45) Date of Patent: May 15, 2001

(54) TORQUE TRANSMISSION DEVICE

(75) Inventor: Carl Edward Trustee, Warwickshire (GB)

(73) Assignee: Dunlop Limited, West Midlands (GB)

( * ) Notice: Subject to any disclaimer, the term of this patent is extended or adjusted under 35 U.S.C. 154(b) by 0 days.

(21) Appl. No.: 09/247,335

(22) Filed: Feb. 10, 1999

(30) Foreign Application Priority Data

Oct. 2, 1998 (GB) .................................................. 9821337

(51) Int. Cl.[7] ....................................................... F16D 55/36
(52) U.S. Cl. .................... 188/71.5; 188/73.35; 188/18 A
(58) Field of Search ................. 188/71.5, 18 A, 188/264 G, 73.36, 73.35; 301/6.1, 6.2, 6.8; 192/70.16, 70.17, 70.19, 70.21

(56) References Cited

U.S. PATENT DOCUMENTS

| | | | |
|---|---|---|---|
| 5,485,898 | 1/1996 | Patko . | |
| 5,908,091 | * 6/1999 | Berwanger | ........................... 188/71.5 |
| 6,003,641 | * 12/1999 | Boehringer et al. | ................ 188/71.5 |

* cited by examiner

Primary Examiner—Douglas C. Butler
(74) Attorney, Agent, or Firm—Young & Thompson

(57) ABSTRACT

In a multi-disc torque transmission device such as an aircraft brake assembly in which stator discs are carried by a torque tube and rotor discs are rotatable with a wheel carried by a bearing mounted on an axle, a spacer member provides radial support between the axle and torque tube and spring provides a resilient force for axial location of the spacer member relative to abutment surfaces defined by at least one of the axle and torque tube or at least one component carried by the axle or torque tube.

19 Claims, 3 Drawing Sheets

Do = Outside diameter
Di = Inside diameter
t = Thickness
Lo = Free height
$L_1$ = Loaded height
$P_1$ = Load at $L_1$

TORQUE TRANSMISSION DEVICE

BACKGROUND OF THE INVENTION

The present invention relates to a torque transmission device such as a brake or clutch. It relates in particular, though not exclusively, to a torque transmission device in the form of a multi-disc brake assembly for an aircraft wheel and to a wheel and brake assembly comprising said torque transmission device.

An aircraft brake assembly typically comprises a torque tube having a splined outer surface on which is mounted a series of stator type friction discs of a material such as steel or carbon. The stator discs are interleaved with rotor discs carried by the aircraft wheel and the interleaved assembly of discs is axially compressible between a series of circumferentially spaced actuation pistons secured to one axial end region of the torque tube and a thrust reaction member at the other end region of the torque tube.

The torque tube is coaxial with a wheel axle relative to which a wheel is rotatably mounted by means of bearings secured to the axle, usually in an annular space between the radially outer surface of the axle and the inner surface of the torque tube.

The torque tube commonly includes a so-called pedestal which extends radially inwards to a foot portion that is supported by the radially outer surface of the axle.

In the aforedescribed construction of a typical aircraft brake assembly the torque tube locates the stator discs, provides a thermal barrier between the brake friction discs and the axle, increases whirl stability and enhances vibration damping in addition to the structural function of transmitting torque during a braking operation.

During a braking operation the torque transmitted by the torque tube can result in a change in the annular configuration of that tube. The torque tube can experience some consequential whirl instability and torsional movement and can also experience squeal vibrations. It is recognised by brake designers that it would be preferable to achieve an improvement in the precision with which the configuration of the torque tube is maintained during braking operations so as to improve whirl stability, increase torsional damping and reduce squeal vibrations.

One proposal for endeavouring to improve the maintenance of the torque tube configuration during braking operations is described in the specification of U.S. Pat. No. 5,485,898 (Patko). That proposal comprises provision of a spacer member located radially between the torque tube and axle, at a position axially outwards of the conventional pedestal, so as to lie axially between the pedestal and wheel bearings.

The pedestal typically is integral with the torque tube and extends radially inwardly for support by bushing means associated with the axle. The spacer member is located axially between a radially inner region of that pedestal and the wheel bearings.

The outer diameter surface of the spacer member is provided with a coating such as aluminium bronze which contacts and supports the inner diameter surface of the torque tube. The coating may serve to provide improved frictional contact between the spacer member and inner diameter surface of the torque tube. Additionally a support ring is disposed between the inner diameter surface of the spacer member and the outer diameter surface of the axle, the support ring and spacer member each including respective splines to effect a splined interconnection which prevents relative rotation of the ring and spacer member. In this construction it is claimed by the prior art teaching that the provision of the spacer member leads to improved torque tube configuration stability and support.

It has now been found that notwithstanding the alleged benefits of a spacer member and coated surface there are problems due to fretting and/or galling wear at the contact areas between the spacer member and adjacent surfaces. Small movements at those interfaces lead to wear and in consequence yet further interface movement during braking operations. As that wear, and hence relative movement, increases there is a progressive reduction in the beneficial effects which the spacer member might otherwise provide.

SUMMARY OF THE INVENTION

An object of the present invention is to provide means by which the effectiveness of the spacer member of a torque transmission device such as an aircraft brake assembly may be preserved better during the working life of the device, or at least during the period between normal service operations.

According to the present invention it is taught that spring means is employed to provide an axial force that resiliently loads the interfaces between the torque tube pedestal and the spacer member, and/or between the spacer member and other structure of the torque transmission device, such as wheel bearing means.

The spring means preferably is subject normally to compression load when in use. Preferably the resiliency of the spring means enables it to prevent or at least substantially eliminate relative movement at said interface(s) during normal use.

Examples of suitable spring means include a metal spring, such as a frusto-conical disc spring (known generally as a Belleville washer), or a wave type disc spring or other type of metallic annular spring washer. Alternatively the spring means may be an element, such as a ring-shaped member, of a resilient polymeric or other non-metallic material provided that the temperatures attained in use of the torque transmission device will not damage that material.

Two or more spring means of the same or different types may be used in combination between a pair of confronting abutment surfaces. Thus, for example, a plurality of Belleville washers may be combined in a parallel, nested configuration or in a series arrangement or in a combination of nested and series.

BRIEF DESCRIPTION OF THE DRAWINGS

An embodiment of the present invention is described below, by way of example, following a more detailed description of a prior art aircraft brake assembly, each with reference to the Drawings, in which.

DESCRIPTION OF THE PREFERRED EMBODIMENTS

Figure 1:
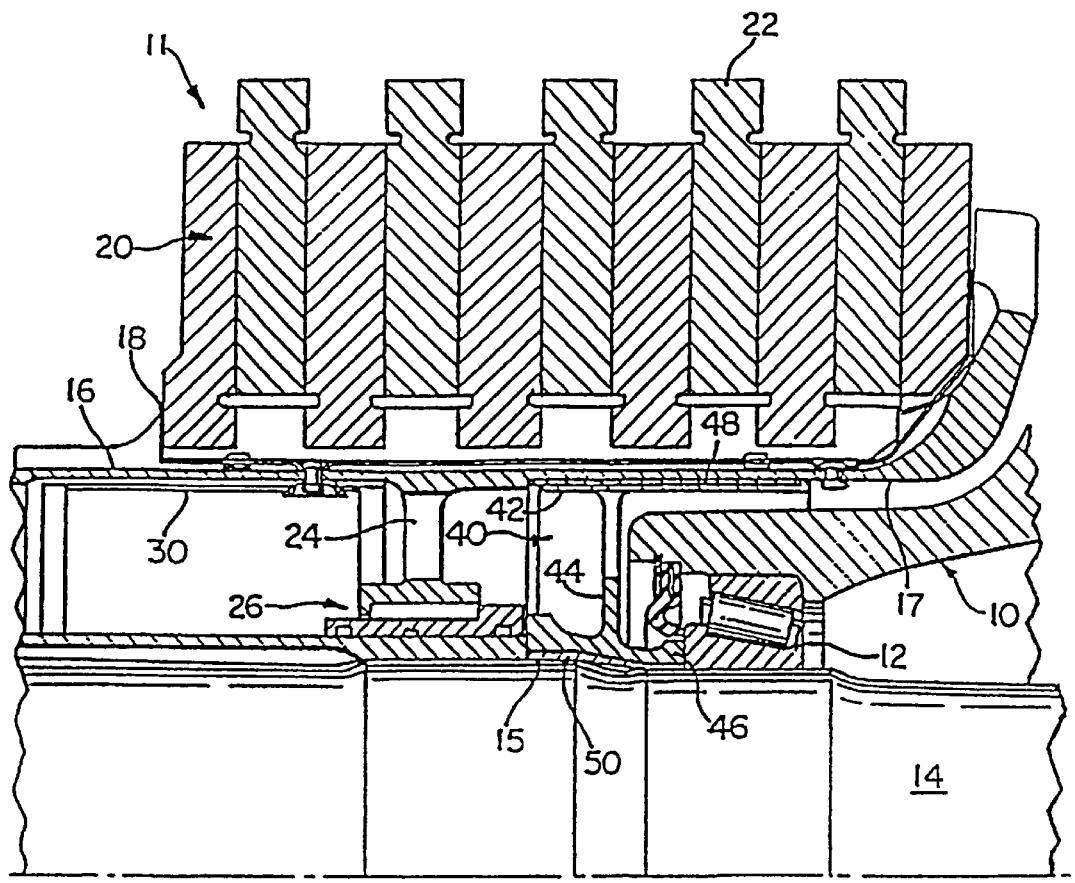
FIG. 1 illustrates a partial section view of a prior art aircraft brake.
Figure 2:
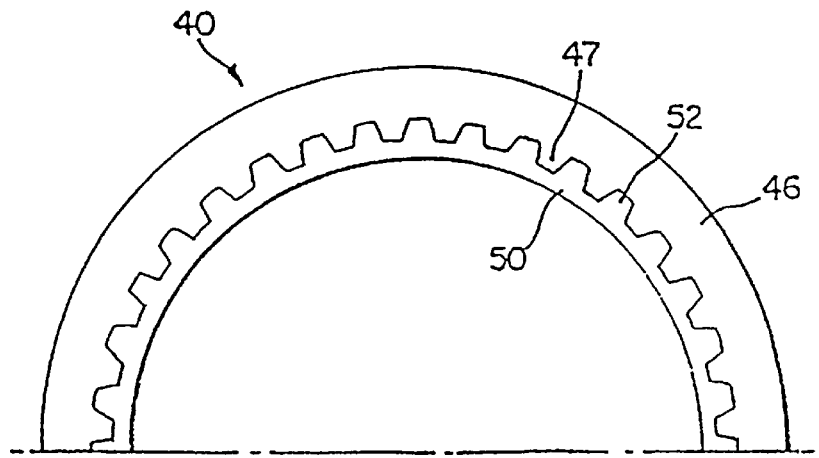
FIG. 2 is a partial end view of the splined interface between the spacer member and support ring of the brake of FIG. 1.

FIG. 1 is a partial section view of an aircraft wheel and brake as shown in U.S. Pat. No. 5,485,898. As is described in that publication, the aircraft wheel, designated generally by reference numeral 10, is supported by bearing means 12 located about an axle 14. Located about axle 14 is an aircraft brake 11 (partially illustrated) having a torque tube 16 (connected with a not shown piston housing) which includes a plurality of splines 18 that connect with slots (not shown) of a plurality of stator discs 20. Interleaved with stator discs 20 is a plurality of rotor discs 22 which engage not shown splines of the wheel. Torque tube 16 includes an integral pedestal 24 located upon a bushing assembly indicated generally by reference numeral 26. A heat shield 30 is located about a portion of the inner diameter surface 17 of torque tube 16. Located between the inner diameter surface 17 of torque tube 16 and the outer diameter surface 15 of axle 14 is a spacer member designated generally by reference numeral 40. Spacer member 40 includes an outer diameter surface of and axially extending portion 42, a radially extending portion 44, and an inner diameter surface of an axially extending portion 46. The outer diameter surface of axially extending portion 42 engages and/or supports the inner diameter surface 17 of torque tube 16 (or e.g. an interposed axial extension of the outer part of the pedestal 24). Portion 42 may also include a coating or sleeve 48 for engagement with inner diameter surface 17 of torque tube 16. The coating may be aluminium bronze and the sleeve may be either copper beryllium or aluminium bronze, in order to improve frictional contact with inner diameter surface 17 and to prevent galling. The spacer member may be made of stainless steel, and depending on its composition the use of the coating or sleeve 48 is optional. The inner diameter surface or axially extending portion 46 is supported by the outer diameter surface 15 of axle 14, and is retained axially in position by the pedestal 24 and bearing means 12. A support ring 50 may be press fitted on the outer diameter surface of axle 14 so that it is positioned non-rotatably relative to axle 14 and include at its outer diameter a plurality of splines 52 which interface with a plurality of splines 47 (see FIG. 2) on the inner diameter surface of axially extending portion 46, such that support ring 50 and axially extending portion 46 are fixed to one another to prevent rotation therebetween. The ring 50 may be made of either aluminium bronze or copper beryllium.

Figure 3:
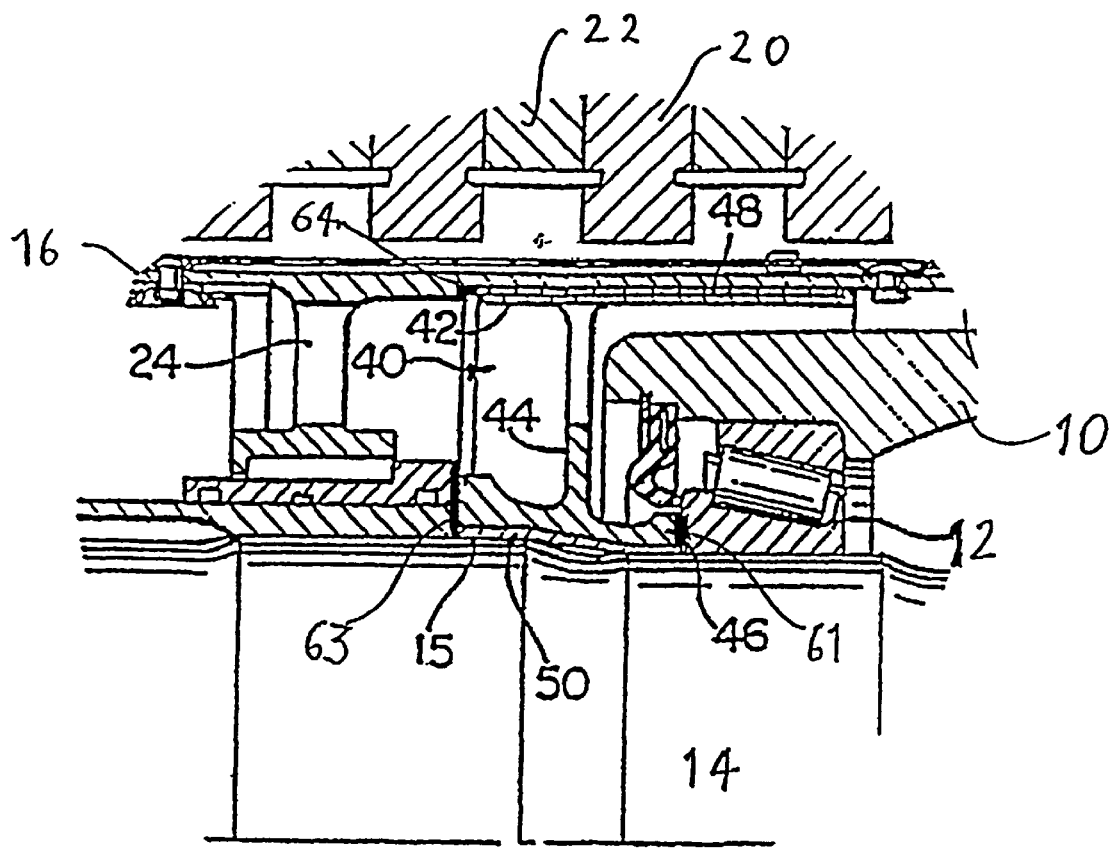
FIG. 3 is a view of part of FIG. 1 showing a brake in accordance with the present invention.

In the improvement of the present invention, as shown in FIG. 3, a resilient washer 61 is provided between the confronting axially facing surfaces of the portion 46 of spacer member 40 and the bearing means 12. Another washer 63 is provided between the other end face of the portion 46 and the pedestal 24. A third washer 64 optionally is provided between a radially outer face of the spacer member 40 and a confronting shoulder surface of the pedestal. The washers 61,63 also bear resiliently against respective ends of the support ring 50.

Figure 4:
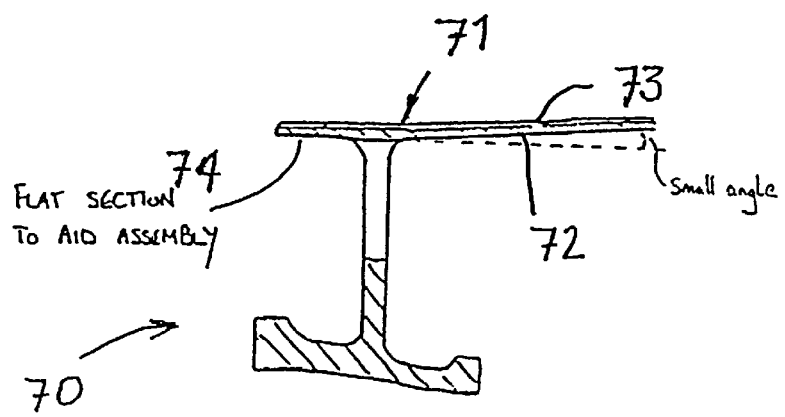
FIG. 4 is a sectional view of an alternative spacer member.

The invention may be applied also to a torque transmission device in which the aforedescribed spacer member 40 is replaced by a spacer member 70 as shown in FIG. 4. Spacer member 70 has a non-rigid radially outer portion 71 which in part 72 defines a non-cylindrical outer surface 73 that is deformable to bear resiliently against the inner diameter surface 17 of torque tube 16.

To aid assembly a part 74 of the length of the outer portion 71 which first enters the torque tube during assembly has a cylindrical outer surface.

The surface 73 of the non-cylindrical part 72 flares outwardly away from the part 74 to provide the concave section as seen in the cross-section view of FIG. 4. It can therefore act as a spring means to prevent or reduce relative movement against the torque tube (or pedestal extension).

The outer portion 71 optionally may include a coating or sleeve as described above as item 48 in the context of the spacer member 40, e.g. to prevent or reduce galling.

Figure 5A:
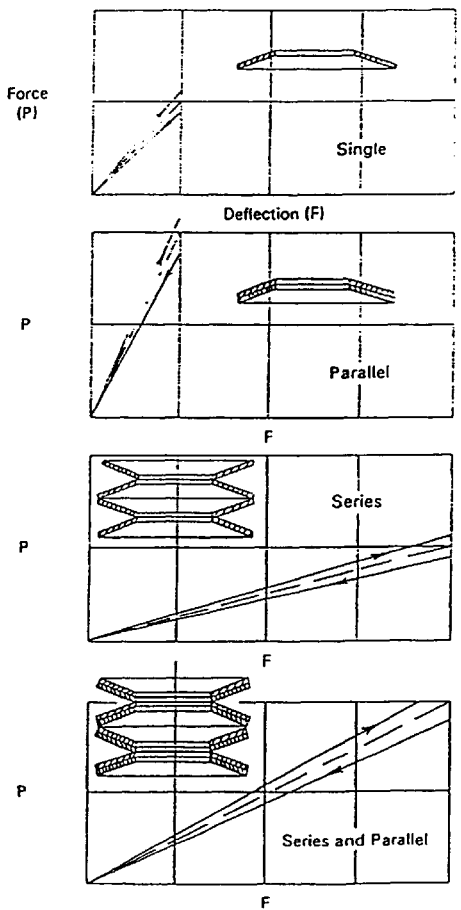
FIGS. 5a and 5b show types of metal springs.
Figure 5B:
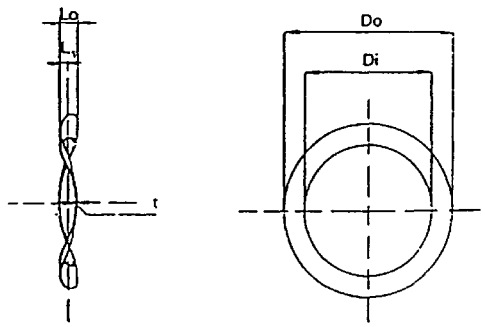

The resilient washers are each comprised by annular metallic type elements in order to withstand the high temperatures which can arise in operation of aircraft brakes. Suitable washers include Belleville springs which may be used singly, in series, in parallel or in combination of series and parallel as shown in FIG. 5*a*. Alternatively, for example, the washers may be wave type disc springs as shown in FIG. 5*b* and which may be used singly, in parallel, in series or in a series and parallel combination. Belleville and wave type springs may be used in combination between a pair of the confronting surfaces.

The provision of one or more of the resilient elements 61,63,64 assists in preserving axial loading at interface surfaces during braking operations, thereby reducing the conventional tendency for fretting/galling wear and providing an improved wear life.

What is claimed is:

1. A torque transmission device comprising:

a torque tube having an inner diameter surface;

a plurality of stator type friction discs mounted on the torque tube;

an axle which extends coaxially relative to and within the torque tube for rotatably supporting a rotatable member which has associated therewith a plurality of rotor type friction discs arranged with said rotor discs each interposed between a successive pair of stator discs in a disc assembly which is axially compressible for torque transmission between the torque tube and the rotatable member;

an annular spacer member having an outer diameter surface which extends radially between the axle and torque tube to provide radial support between the torque tube and axle, the outer diameter surface of said annular spacer member being in frictional engagement with the inner diameter surface of said torque tube;

axially spaced abutment surfaces which axially locate the spacer member; and spring means between at least one of said abutment surfaces and a confronting surface of the spacer member to provide an axial force resiliently to load the confronting surfaces of the spacer member and the abutments surfaces.

2. A torque transmission device according to claim 1, wherein the spring means comprises a metallic member.

3. A torque transmission device according to claim 1, wherein said spring means comprises a Belleville type spring and/or a wave type spring.

4. A torque transmission device according to claim 1, wherein a said abutment surface is provided by the axle or a component carried by the axle.

5. A torque transmission device according to claim 4, wherein said spring means is provided between the spacer member and a confronting surface of a bearing means carried by the axle for rotatably supporting the rotatable member.

6. A torque transmission device according to claim 4, wherein said spring means is provided between the spacer member and a confronting surface of a shoulder defined by the torque tube.

7. A torque transmission device according to claim 4, wherein a support pedestal extends radially between the axle and torque tube, and said spring means is provided between the spacer member and a confronting surface of the support pedestal.

8. A torque transmission device according to claim 7, wherein the support pedestal comprises an annular foot portion and an axial end face of said foot portion defines one of said abutment surfaces.

9. A torque transmission device according to claim 8, wherein the spacer member lies axially between the pedestal member and bearing means carried by the axle for rotatably supporting said rotatable member.

10. A torque transmission device according to claim 7, wherein the support pedestal comprises, at a radially outer region, an axially extending portion which extends axially between the torque tube and a radially outer surface of the spacer member.

11. A torque transmission device according to claim 10, wherein spring means is provided between an end of a radially outer region of the spacer member and an abutment surface defined by a support pedestal shoulder adjacent said axially extending portion of the pedestal.

12. A torque transmission device according to claim 1, wherein the spacer member comprises a non-rigid radially outer portion which defines a non-cylindrical outer surface deformable to bear resiliently against an inner surface of a surrounding member.

13. A torque transmission device according to claim 12, wherein said surrounding member is the torque tube.

14. A torque transmission device according to claim 12, wherein a support pedestal comprises, at a radially outer region, an axially extending portion which extends axially between the torque tube and a radially outer surface of the spacer member, and said surrounding member is said axially extending portion of the support pedestal.

15. An aircraft brake assembly comprising a torque transmission device according to claim 1.

16. An aircraft wheel and brake assembly comprising a torque transmission device according to claim 1 and a wheel rotatably mounted by bearing means carried by the axle.

17. An aircraft wheel and brake assembly comprising:

an aircraft wheel supported for rotation by wheel bearing means on an axle;

a torque tube located about said axle and including a tubular part having an inner surface and including an annular pedestal which extends radially inwards from the inner surface of the tubular part towards the axle for supporting the torque tube relative to the axle;

a pack of brake discs including rotor discs mounted for rotation with said wheel and alternating stator discs connected to the torque tube for axial compression of the pack to transmit braking torque from the wheel to the torque tube via the discs;

an annular spacer member having an outer surface and being located about said axle between the annular pedestal and the wheel bearing means, the spacer member extending radially between the axle and the inner surface of the tubular part of said torque tube, the outer surface of the spacer member being frictionably engaged with the inner surface of the tubular part of said torque tube for the spacer member to provide additional radial support to the torque tube relative to the axle;

first and second axially spaced abutment surfaces positioned between said annular pedestal and said wheel for axially locating the spacer member; and spring means engaged between at least one of said abutment surfaces and a confronting surface of the spacer member for providing an axial loading force between said at least one abutment surface and the spacer member.

18. An aircraft wheel and brake assembly comprising:

an aircraft wheel supported for rotation by wheel bearing means on an axle;

a torque tube located about said axle and including a tubular part having an inner surface and further including a radially inwardly extending annular pedestal;

bushing means located around said axle and having an outer surface engaged with the annular pedestal for supporting the torque tube relative to the axle;

a pack of brake discs including rotor discs mounted for rotation with said wheel and alternating stator discs connected to the torque tube for axial compression of the pack to transmit braking torque from the wheel to the torque tube via the discs;

an annular spacer member having an outer surface and being located about said axle between the bushing means and the wheel bearing means, the spacer member extending radially between the axle and the inner surface of the tubular part of said torque tube, the outer surface of the spacer member being frictionably engaged with the inner surface of the tubular part of said torque tube for the spacer member to provide additional radial support to the torque tube relative to the axle; and first and second spring washers located respectively between said bushing means and said annular spacer member and between said annular spacer members and said wheel bearing means for providing an axial loading force between the bushing means and the spacer member and between the spacer member and the wheel bearing means.

19. The assembly according to claim 18, further comprising a third spring washer located between respective abutment surfaces defined by respective portions of the torque tube and the annular spacer member adjacent the outer surface of the annular spacer member.

* * * * *

UNITED STATES PATENT AND TRADEMARK OFFICE
CERTIFICATE OF CORRECTION

PATENT NO. : 6,230,852 B1  
DATED : May 15, 2001  
INVENTOR(S) : Carl Edward Trustee Page 1 of 1

It is certified that error appears in the above-identified patent and that said Letters Patent is hereby corrected as shown below:

<u>Title page,</u>  
Item [73], change the name of the assignee from "Dunlop Limited" to -- Dunlop Aerospace Limited --

Signed and Sealed this

Seventh Day of May, 2002

Attest:

Attesting Officer

JAMES E. ROGAN  
Director of the United States Patent and Trademark Office